United States Patent
Soler et al.

(10) Patent No.: US 9,306,783 B2
(45) Date of Patent: Apr. 5, 2016

(54) SELECTIVE ACTIVATION OF VAMOS-2 MODE

(71) Applicant: ST-Ericsson SA, Plan-les-Ouates (CH)

(72) Inventors: Marc Soler, Golfe Juan (FR); Eric Alliot, Mouans-Sartoux (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/343,080

(22) PCT Filed: Oct. 4, 2012

(86) PCT No.: PCT/EP2012/069663
§ 371 (c)(1),
(2) Date: Mar. 6, 2014

(87) PCT Pub. No.: WO2013/050499
PCT Pub. Date: Apr. 11, 2013

(65) Prior Publication Data
US 2014/0315534 A1    Oct. 23, 2014

Related U.S. Application Data

(60) Provisional application No. 61/550,550, filed on Oct. 24, 2011.

(30) Foreign Application Priority Data

Oct. 5, 2011 (EP) .................................. 11306289

(51) Int. Cl.
*H04W 72/00* (2009.01)
*H04L 27/26* (2006.01)
(Continued)

(52) U.S. Cl.
CPC ........ *H04L 27/2601* (2013.01); *H04L 27/0008* (2013.01); *H04L 27/2089* (2013.01); *H04W 8/08* (2013.01); *H04L 25/025* (2013.01); *H04L 25/0224* (2013.01)

(58) Field of Classification Search
None
See application file for complete search history.

(56) References Cited

U.S. PATENT DOCUMENTS

2010/0279701 A1* 11/2010 Chen ......................... 455/452.2
2010/0302990 A1* 12/2010 Lopez et al. .................. 370/312
(Continued)

FOREIGN PATENT DOCUMENTS

CN    102098239      *  6/2011
EP    2 157 752 A2    2/2010
(Continued)

OTHER PUBLICATIONS

Meik Kottkamp "VAMOS Technology Introduction, Application Note" Rohde & Schwarz GmbH & Co. KG, 2010.*
(Continued)

*Primary Examiner* — Suhail Khan
(74) *Attorney, Agent, or Firm* — Patent Portfolio Builders PLLC

(57) ABSTRACT

Method of data processing for selectively activating, at a mobile station, a mode of communication related to VAMOS-2 technology. The method includes the steps of: receiving a first signal of a first subchannel, the first signal containing a first training sequence, and receiving a second signal of a second subchannel, the second signal containing a second training sequence, the second signal being orthogonally multiplexed with respect to the first signal, and using the first training sequence and the second training sequence to: determine a value of a parameter defining a ratio between the first subchannel power and the second subchannel power, and determine a signal to noise ratio estimation, and determine, using the parameter value and the signal to noise estimation, whether the mode of communication has to be activated.

11 Claims, 2 Drawing Sheets

(51) Int. Cl.
*H04L 27/00* (2006.01)
*H04L 27/20* (2006.01)
*H04W 8/08* (2009.01)
*H04L 25/02* (2006.01)

(56) References Cited

U.S. PATENT DOCUMENTS

2011/0082689 A1* 4/2011 Juncker et al. ............... 704/201
2011/0176620 A1* 7/2011 Xin et al. ...................... 375/259
2012/0244817 A1* 9/2012 Das et al. ................... 455/67.11

FOREIGN PATENT DOCUMENTS

WO 2009/096840 A1 10/2008
WO 2011/042881 A1 10/2010

OTHER PUBLICATIONS

International Search Report issued in corresponding International application No. PCT/EP2012/069663, date of mailing Nov. 6, 2012.

* cited by examiner

SELECTIVE ACTIVATION OF VAMOS-2 MODE

TECHNICAL FIELD

The present invention relates to telecommunications. It relates particularly to the 2G GSM (Global System for Mobile Communications) generation of telecommunications protocol, in particular within the VAMOS-1 (Voice services over Adaptive Multi-user channels on One Slot-1) and VAMOS-2 standards for enabling MIMO (Multiple-Input Multiple-Output) over a single GSM channel.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Time division multiplex access (TDMA) wireless systems such as GSM transmit data in fixed-length timeslots, and a training sequence is included in the timeslot, which is designed to allow the receiver to detect timing information and to obtain channel coefficients through channel estimation for further channel equalization.

Eight training sequences for GSM normal bursts are defined in the 3GPP specification (see TS 45.002, "GERAN: Multiplexing and multiple access on the radio path") and are used for burst synchronization and channel estimation in current GSM/EDGE Radio Access Network (GERAN) systems.

Voice services over Adaptive Multi-user channels on One Slot (VAMOS) is an ongoing work item in GERAN that aims at increasing voice capacity of the GERAN in the order of a factor of two per base station (BTS) transceiver both in the uplink and the downlink by multiplexing at least two users simultaneously on the same physical radio resource, i.e., multiple users share the same carrier frequency and the same timeslot.

VAMOS technology is a cost efficient way to handle increasing traffic growth, and can further help operators to make more efficient use of their GSM resources. The more efficient use of the GSM networks further means that less hardware is needed to support a given traffic hence helps to reduce energy consumption and related CO2 emissions.

VAMOS technology includes two phases. The first phase (VAMOS-1) comprises the introduction of new training sequences and requires an update of channel estimation in the mobile station (MS). The second phase (VAMOS-2) requires implementation, in the mobile station, of an advanced receiver mode or VAMOS-2 mode, in which the mobile station receiver is set to process VAMOS-2 communication.

A current solution consists to activate VAMOS-2 mode by default, or systematically when GSM network is informing the mobile station with binary flag that data are transmitted in VAMOS-2 mode. This solution is not providing good signal to noise ratio (SNR) performances.

EP 2 157 752 discloses a method for reducing the SNR degradation by using a training sequence selection. However, this method may fail to optimize the SNR in some GSM network configurations.

Embodiments of the invention will improve the situation.

SUMMARY

To address these needs, a first aspect of the present invention relates to a method of data processing for selectively activating, at a mobile station, a mode of communication related to VAMOS-2 technology, the method comprising the steps of:
receiving a first signal of a first subchannel, the first signal containing a first training sequence, and receiving a second signal of a second subchannel, the second signal containing a second training sequence, the second signal being orthogonally multiplexed with respect to the first signal,
using the first training sequence and the second training sequence to:
determine a value of a parameter defining a ratio between the first subchannel power and the second subchannel power, and
determine a signal to noise ratio estimation, and
determining, by using the parameter value and the signal to noise estimation, whether the said mode of communication has to be activated.

Embodiments of the invention thus aim at optimising the Signal to Noise Ratio (SNR) in a GSM (Global System for Mobile Communications) network.

The step of determining a parameter value may comprise at least one operation of calculating a channel estimation $\hat{h}_L(\alpha)$ for each parameter value of a set of possible parameter values, and determining the parameter value satisfying at least one predetermined criteria.

The step of determining a parameter value may comprise at least the operations of:
for each parameter value $\alpha$ of the set of possible parameter values:
defining a circulant training sequence matrix M as:

$$M(\alpha) = \begin{bmatrix} m_{L+1}(\alpha) & \cdots & m_2(\alpha) & m_1(\alpha) \\ m_{L+2}(\alpha) & \cdots & m_3(\alpha) & m_2(\alpha) \\ \vdots & \vdots & \vdots & \vdots \\ m_{P+L}(\alpha) & \cdots & m_{P+1}(\alpha) & m_P(\alpha) \end{bmatrix}$$

where L is a correlation length, P is a correlation window, and $m_{P+L}(\alpha)$ is a training sequence related to the parameter value,
defining a channel estimation $\hat{h}_L(\alpha)$ by:

$$\hat{h}_L(\alpha) = ((M(\alpha))^H M(\alpha))^{-1} M(\alpha) y,$$

where $A^H$ is the Hermitian of the matrix A, and
determining the parameter value as the one satisfying the predetermined criteria:

$$(\hat{h}_L, \alpha) = \operatorname*{argmin}_{h(\alpha),\alpha} \|y - M(\alpha) h_L(\alpha)\|^2$$

The parameter may be an angle, the set of parameter values comprising $$0, \frac{\pi}{8}, \frac{\pi}{4}, \frac{3\pi}{8}$$

or a SCPIR ratio, the set of parameter values being tested comprising +4 dB, 0 dB, −4 dB, −8 dB, −10 dB.

The step of determining whether said mode of communication has to be activated may comprise an operation of comparing the determined parameter value with at least one predetermined parameter threshold and an operation of comparing the signal to noise ratio estimation with at least one predetermined signal to noise ratio threshold.

A second aspect of the present invention relates to a computer program product comprising a computer readable medium, having thereon a computer program comprising program instructions, the computer program being loadable into a data-processing unit and adapted to cause the data-processing unit to carry out the steps of any of the method according to the first aspect when the computer program is run by the data-processing unit.

A third aspect of the present invention relates to a mobile station configured to:
  receive a signal containing simultaneously two sub-channels, the first sub-channel containing a first training sequence, and the second sub-channel containing a second training sequence, the second signal being orthogonally multiplexed with respect to the first signal,
  use the first training sequence and the second training sequence to:
    determine a value of a parameter defining a ratio between the first subchannel power and the second subchannel power, and
    determine a signal to noise ratio estimation, and
  determine, by using the parameter value and the signal to noise estimation, whether the said mode of communication has to be activated.

The mobile station may be further configured to calculate a channel estimation $\hat{h}_L(\alpha)$ for each parameter value of a set of possible parameter values, and determine the parameter value satisfying at least one predetermined criteria.

The mobile station may be further configured to:
  for each parameter value α of the set of possible parameter values:
    define a circulant training sequence matrix M as:

$$M(\alpha) = \begin{bmatrix} m_{L+1}(\alpha) & \ldots & m_2(\alpha) & m_1(\alpha) \\ m_{L+2}(\alpha) & \ldots & m_3(\alpha) & m_2(\alpha) \\ \vdots & \vdots & \vdots & \vdots \\ m_{P+L}(\alpha) & \ldots & m_{P+1}(\alpha) & m_P(\alpha) \end{bmatrix}$$

where L is a correlation length, P is a correlation window, and $m_{P+L}(\alpha)$ is a training sequence related to the parameter value,
    define a channel estimation $\hat{h}_L(\alpha)$ by:

$$\hat{h}_L(\alpha) = ((M(\alpha))^H M(\alpha))^{-1} M(\alpha) y,$$

where $A^H$ is the Hermitian of the matrix A, and
  determine the parameter value as the one satisfying the predetermined criteria:

$$(\hat{h}_L, \alpha) = \underset{h(\alpha),\alpha}{\mathrm{argmin}} \|y - M(\alpha) h_L(\alpha)\|^2$$

The parameter may be an angle, the set of parameter values comprising $$0, \frac{\pi}{8}, \frac{\pi}{4} \text{ and } \frac{3\pi}{8}$$

or a SCPIR ratio, the set of parameter values being tested comprising +4 dB, 0 dB, −4 dB, −8 dB, −10 dB.

The mobile station may be further configured to compare the determined parameter value with at least one predetermined parameter threshold and compare the signal to noise ratio estimation with at least one predetermined signal to noise ratio threshold.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF EMBODIMENTS

Embodiments of the invention deal with the problem of optimising the Signal to Noise Ratio (SNR) and reducing the Block Error Rate (BLER) in a GSM (Global System for Mobile Communications) network.

Figure 1:
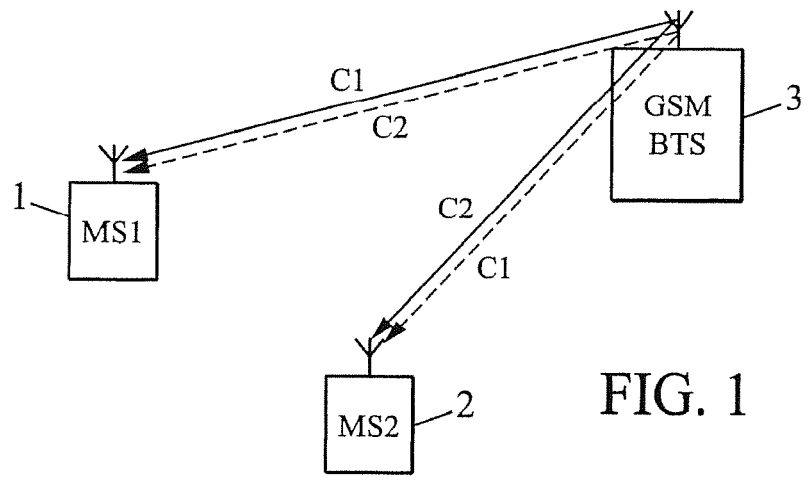
FIG. 1 is a schematic block diagram of a GSM network according to some embodiments of the invention.

FIG. 1 shows a GSM network comprising a first mobile station (MS) 1, a second mobile station 2 and a GSM base station (BTS) 3, according to some embodiments of the invention.

The base station 3 is configured to communicate with each mobile station 1, 2 using several subchannels, for example a first subchannel C1 and a second subchannel C2. The first subchannel C1 may use a first GMSK (Gaussian Minimum Shift Keying) signal. The second sub-channel C2 may use a second GMSK signal orthogonally multiplexed (phase shift of 90°) with respect to the first GMSK signal. In other words, the subchannels C1, C2 are mapped to the I- and Q-subchannels of a GMSK modulation in which the ratio of I-subchannel and Q-subchannel can be adaptively controlled.

Figure 2:
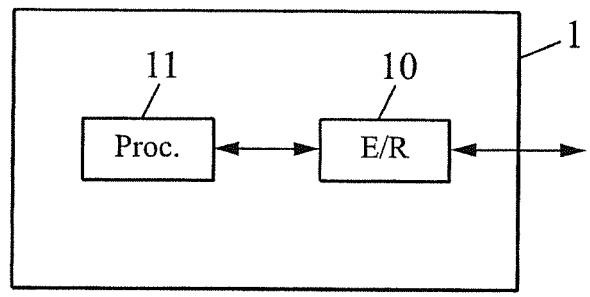
FIG. 2 is a schematic block diagram of a mobile station of the GSM network according to some embodiments of the invention.

The mobile station 1 (FIG. 2) comprises a transmitting-receiving block 10, configured to receive signals from the base station 3 and to transmit signals to the base station 3. The mobile station 1 further comprises a processing block 11 configured to process the signals.

The mobile station 1 is VAMOS-1 capable, meaning that the mobile station 1 is configured to manage VAMOS-1 communications. For example, a complex LS based channel estimation algorithm is implemented in the mobile station 1 to provide it with the capability to support VAMOS-1.

The mobile station 1 is further VAMOS-2 capable, meaning that the mobile station 1 is configured to manage VAMOS-2 communications.

The mobile station 1 is configured to determine a value of a parameter defining a ratio between the first subchannel power and the second subchannel power. The parameter is for example an angle α defining the mapping between modulating bits and quaternary symbols.

The mobile station 1 is further configured to perform an SNR estimation.

The mobile station 1 is further configured to selectively activate, depending on the angle α value and on the SNR estimation, a VAMOS-2 mode, in which the mobile station 1 is set to manage VAMOS-2 communications. In other words, the mobile station 1 is configured to switch between a first mode of communication, called VAMOS-2 mode, and a second mode of communication, in which the mobile station 1 is configured to manage VAMOS-1 communications or legacy communications.

The mobile station 2 is similar to the mobile station 1.

The first subchannel C1 may use one of the eight GSM Training Sequence Codes (TSC) of Table 2. The second subchannel C2 may use one of the eight TSC of Table 3.

TABLE 2

| TSC | Training sequence bits |
|---|---|
| 0 | (0, 0, 1, 0, 0, 1, 0, 1, 1, 1, 0, 0, 0, 0, 1, 0, 0, 0, 1, 0, 0, 1, 0, 1, 1, 1) |
| 1 | (0, 0, 1, 0, 1, 1, 0, 1, 1, 1, 0, 1, 1, 1, 1, 0, 0, 0, 1, 0, 1, 1, 0, 1, 1, 1) |
| 2 | (0, 1, 0, 0, 0, 0, 1, 1, 1, 0, 1, 1, 1, 0, 1, 0, 0, 0, 1, 0, 0, 0, 0, 1, 1, 1, 0) |
| 3 | (0, 1, 0, 0, 0, 1, 1, 1, 1, 0, 1, 1, 0, 1, 0, 0, 0, 0, 1, 0, 0, 0, 1, 1, 1, 1, 0) |
| 4 | (0, 0, 0, 1, 1, 0, 1, 0, 1, 1, 1, 0, 0, 1, 0, 0, 0, 0, 0, 1, 1, 0, 1, 0, 1, 1) |
| 5 | (0, 1, 0, 0, 1, 1, 1, 0, 1, 0, 1, 1, 0, 0, 0, 0, 0, 1, 0, 0, 1, 1, 1, 0, 1, 0) |
| 6 | (1, 0, 1, 0, 0, 1, 1, 1, 1, 1, 0, 1, 1, 0, 0, 0, 1, 0, 1, 0, 0, 1, 1, 1, 1, 1) |
| 7 | (1, 1, 1, 0, 1, 1, 1, 1, 0, 0, 0, 1, 0, 0, 1, 0, 1, 1, 1, 0, 1, 1, 1, 1, 0, 0) |

TABLE 3

| TSC | Training sequence bits |
|---|---|
| 0 | (0, 1, 1, 0, 0, 0, 1, 0, 0, 0, 1, 0, 0, 1, 0, 0, 1, 1, 1, 1, 0, 1, 0, 1, 1, 1) |
| 1 | (0, 1, 0, 1, 1, 1, 1, 0, 0, 1, 0, 1, 0, 1, 1, 0, 1, 1, 1, 1, 0, 0, 0, 0, 1) |
| 2 | (0, 1, 0, 0, 0, 0, 0, 1, 0, 1, 1, 0, 0, 0, 1, 1, 1, 0, 1, 1, 1, 0, 0, 1, 1, 0, 0) |
| 3 | (0, 0, 1, 0, 1, 1, 0, 1, 1, 1, 0, 1, 1, 1, 0, 0, 1, 1, 1, 1, 0, 1, 0, 0, 0, 0) |
| 4 | (0, 1, 1, 1, 0, 1, 0, 0, 1, 1, 1, 1, 0, 1, 0, 0, 1, 1, 1, 0, 1, 1, 1, 1, 1, 0) |
| 5 | (0, 1, 0, 0, 0, 0, 0, 1, 0, 0, 1, 1, 0, 1, 0, 1, 0, 0, 1, 1, 1, 1, 0, 0, 1, 1) |
| 6 | (0, 0, 0, 1, 0, 0, 0, 0, 1, 1, 0, 1, 0, 0, 0, 0, 1, 1, 0, 1, 1, 1, 0, 1, 0, 1) |
| 7 | (0, 1, 0, 0, 0, 1, 0, 1, 1, 1, 0, 0, 1, 1, 1, 1, 1, 1, 0, 0, 1, 0, 1, 0, 0, 1) |

In alternative, subchannels C1, C2 may use two different TSC among the eight TSC of Table 2, in particular for legacy communications.

At a given mobile station, e.g. the mobile station 1, and given the fact that the two subchannels C1, C2 are transmitted synchronously from the same base station 3 and that they undergo the same channel, the orthogonality of the two subchannels C1, C2 may be completely preserved.

Figure 3:
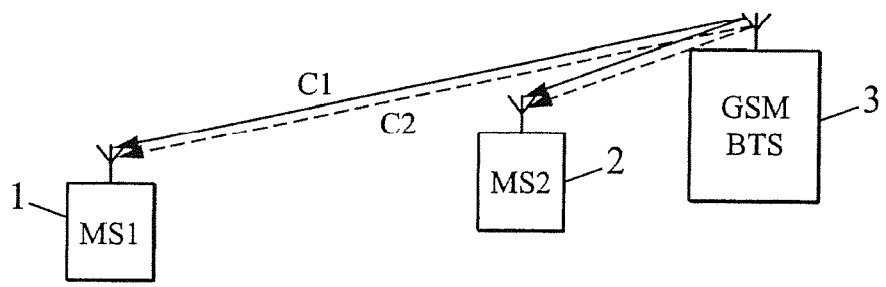
FIG. 3 is a schematic block diagram of the GSM network of FIG. 1 in a configuration in which two mobile stations are at different distances of a base station.

However, when two VAMOS-2 capable mobile stations are to be served by the same base station and are at different distances from the base station, interferences may exist. FIG. 3 shows the GSM network in a configuration in which the first mobile station 1 and the second mobile station 2 are to be served by the same base station 3 and are at different distances from the base station 3.

It has to be noted that a similar situation may happen with a VAMOS-2 capable mobile station and a legacy mobile station with weaker OSC (Orthogonal sub-channel) suppression capabilities.

In order to manage the interferences caused to the more distant mobile station 1, the base station 3 may be configured to perform a power control mechanism.

Figure 4A:
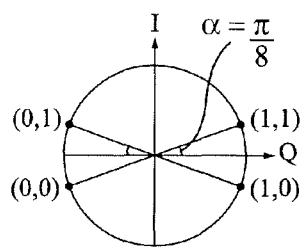
FIG. 4a to FIG. 4c are charts showing a mapping of modulating bits to AQM symbols according to some embodiments of the invention.
Figure 4B:
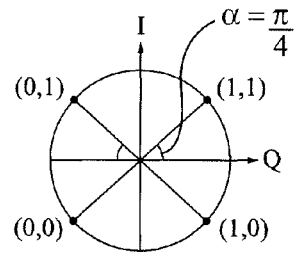
Figure 4C:
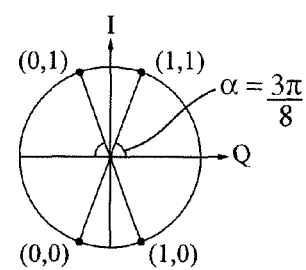

FIG. 4a to FIG. 4c illustrate an example of power control mechanism. In this example, three different configurations are possible regarding the ratio between the I-subchannel power and the Q-subchannel power.

Table 1 presents the mapping of the modulating bits to the quaternary symbols:

TABLE 1

| Modulating bits for $a_i, b_i$ | AQM symbol in polar notation $s_i$ |
|---|---|
| (0, 0) | $-e^{-j\alpha} - e^{j\alpha}$ |
| (0, 1) | $-e^{j\alpha} - e^{-j\alpha}$ |
| (1, 0) | $e^{-j\alpha}$ |
| (1, 1) | $e^{j\alpha}$ |

The angle α is the angle defining the mapping between the modulating bits and the quaternary symbols. In other words, the angle α value defines the ratio between the first subchannel C1 power and the second subchannel C2 power.

Depending on the distances between the base station 3 and the respective mobile stations 1, 2, the base station 3 sets the angle α value as equal to $$\frac{\pi}{8}$$

FIG. 4a), $$\frac{\pi}{4}$$

(FIG. 4b) or $$\frac{3\pi}{8}$$

(FIG. 4c), to set the ratio between the first subchannel C1 power and the second subchannel C2 power. It has to be noted that the alphabet of alpha values may contain other values. Current method is applicable for Sub Channel Power Imbalance Ratio (SCPIR) in the range of [+4 dB . . . −10 dB] and is not restricted to the 3 angular values mentioned above. For example, the angle α value may be equal to 0.

Figure 5:
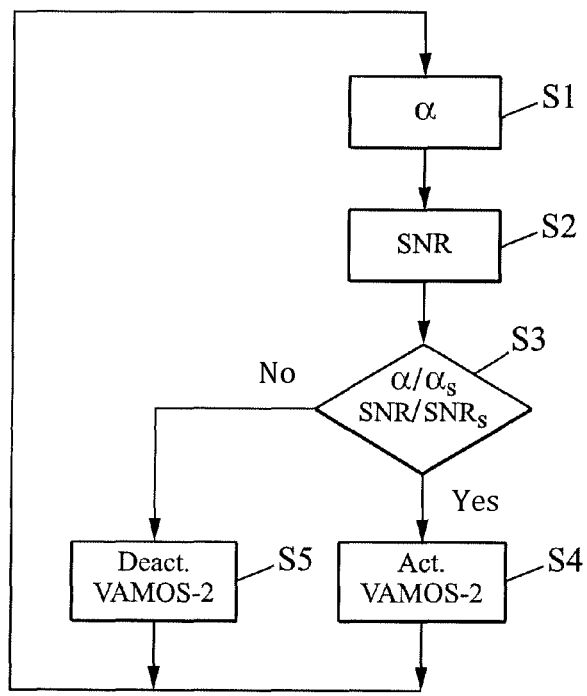
FIG. 5 is a flow chart showing steps of a method of selective activation of a VAMOS-2 mode at a mobile station, according to some embodiments of the invention.

FIG. 5 represents steps of a method of selective activation of the VAMOS-2 mode at a mobile station, according to embodiments of the invention. Steps of the method may be performed at the mobile station 1, 2.

In step S1, the mobile station 1, 2 receives a first signal of the first subchannel C1, the first signal containing a first training sequence, and a second signal of the second subchannel C2, the second signal containing a second training sequence.

Then, the mobile station 1, 2 determines a value of a parameter defining a ratio between the first subchannel power and the second subchannel power. The parameter is for example the angle α. It has to be noted that the angle α value is set by the base station 3 and is not initially known by the mobile station 1, 2.

We call training sequence $m_{want}$ the training sequence of the wanted signal and training sequence $m_{osc}$ the training sequence of the Orthogonal sub-channel (OSC).

The training sequence for a given angle α value is determined as the complex sequence given by $m_{P+L}(\alpha)$, where L is the correlation length and P is the correlation window.

The circulant training sequence matrix M is then given by:

$$M(\alpha) = \begin{bmatrix} m_{L+1}(\alpha) & \cdots & m_2(\alpha) & m_1(\alpha) \\ m_{L+2}(\alpha) & \cdots & m_3(\alpha) & m_2(\alpha) \\ \vdots & \vdots & \vdots & \vdots \\ m_{P+L}(\alpha) & \cdots & m_{P+1}(\alpha) & m_P(\alpha) \end{bmatrix}$$

A channel estimation $\hat{h}_L$, for example an LS channel estimation, is then given by:

$$\hat{h}_L(\alpha) = ((M(\alpha))^H M(\alpha))^{-1} M(\alpha) y$$

where $A^H$ is the Hermitian of the matrix A.

The channel estimation may be a least square channel estimation. To determine the angle α value, a channel estimation $\hat{h}_L(\alpha)$ is calculated with the different hypothesis on value of the angle α, for example for angle α values of $$0, \frac{\pi}{8}, \frac{\pi}{4} \text{ and } \frac{3\pi}{8}$$

or SCPIR ratio like +4, 0 −4, −8, −10 dB.

The channel estimation $\hat{h}_L$ and the angle α value are then determined as the ones satisfying:

$$(\hat{h}_L, \alpha) = \underset{h(\alpha),\alpha}{\operatorname{argmin}} \| y - M(\alpha) h_L(\alpha) \|^2$$

It as to be noted that a CLS channel estimation may be performed in a similar way than the LS estimation, the only difference being in the training sequences used.

In step S2, a SNR estimation is performed. For example, the SNR estimation may be done using an equalizer of the mobile station 1, 2.

In step S3, the mobile station 1, 2 determines whether the VAMOS-2 mode has to be activated or not.

Step S3 may comprise an operation of comparing the angle α value determined in step S1 with a predetermined angle threshold $\alpha_S$ and an operation of comparing the SNR estimation of step S2 with a predetermined SNR threshold $SNR_S$.

The mobile station 1, 2 may then determine that the VAMOS-2 mode has to be activated when the angle α value is above (in alternative is below) the angle threshold $\alpha_S$ and when the SNR estimation is above (in alternative is below) SNR threshold $SNR_S$.

For example, a performance degradation may happen when using VAMOS-2 mode in legacy conditions of communication. Then, the thresholds $\alpha_S$, $SNR_S$ may be set to control an activation of the VAMOS-2 mode only for reliable detected OSC cases with high estimated SNR (reliable estimates). This aims at avoiding performances degradation between VAMOS-1 and VAMOS-2.

The angle threshold $\alpha_S$ may comprise a set of angle thresholds, for example to control the activation of the VAMOS-2 mode for angle alpha value different from 2. In the same way, the SNR threshold $SNR_S$ may comprise a set of SNR thresholds, for example to control the activation of the VAMOS-2 mode for SNR estimation provided by MIC equalizer corresponding to signal power better than −97 or −96 dBm.

If the mobile station 1, 2 has determined that the VAMOS-2 mode has to be activated, the method goes to step S4. If not, the method goes to step S5.

In step S4, the mobile station 1, 2 activates the VAMOS-2 mode.

In step S5, if the VAMOS-2 mode was activated, the mobile station 1, 2 deactivates the VAMOS-2 mode.

The method thus permits to accurately determine the current alpha value by performing complex least square channel estimation on all possible alpha values for channel estimation, and to condition the activation of VAMOS-2 mode on alpha and SNR thresholds to guarantee best performances whatever transmission mode 2G Legacy, VAMOS-1 or VAMOS-2.

In case of legacy transmission or high SCPIR transmission, the combined use of thresholds on alpha estimation and SNR estimation enables to ensure same performances with VAMOS-2 UE (User Equipment) in legacy non-VAMOS conditions than performances obtained with Legacy terminal supporting expressly VAMOS-1 features.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. Method of data processing for selectively activating, at a mobile station, a Voice Services over Adaptive Multi-user Channels on One Slot-2 (VAMOS-2) mode of communication, the method comprising the steps of:
   operating in a VAMOS-1 mode of communication,
   receiving a first signal of a first subchannel, the first signal containing a first training sequence, and receiving a second signal of a second subchannel, the second signal containing a second training sequence, the second signal being orthogonally multiplexed with respect to the first signal,
   using, by the mobile station, the first training sequence and the second training sequence to:
   determine a value of a parameter defining a ratio between a power of the first subchannel and a power of the second subchannel,
   determine a signal to noise ratio estimation, and determining, by using the parameter value and the signal to noise ratio estimation, whether to switch from the VAMOS-1 mode of communication to the VAMOS-2 mode of communication.

2. Method according to claim 1, wherein the step of determining the parameter value comprises at least one operation of calculating a channel estimation $\hat{h}_L(\alpha)$ for each parameter value of a set of possible parameter values, and determining the parameter value satisfying at least one predetermined criteria.

3. Method according to claim 2, wherein the step of determining the parameter value comprises at least the operations of:
for each parameter value $\alpha$ of the set of possible parameter values:
defining a circulant training sequence matrix M as:

$$M(\alpha) = \begin{bmatrix} m_{L+1}(\alpha) & \ldots & m_2(\alpha) & m_1(\alpha) \\ m_{L+2}(\alpha) & \ldots & m_3(\alpha) & m_2(\alpha) \\ \vdots & \vdots & \vdots & \vdots \\ m_{P+L}(\alpha) & \ldots & m_{P+1}(\alpha) & m_P(\alpha) \end{bmatrix}$$

where L is a correlation length, P is a correlation window, and $m_{P+L}(\alpha)$ is one of the first and second training sequences related to the parameter value,
defining a channel estimation $\hat{h}_L(\alpha)$ by:

$$\hat{h}_L(\alpha) = ((M(\alpha))^H M(\alpha))^{-1} M(\alpha) y,$$

where $A^H$ is the Hermitian of the matrix A and y is one of the first and second received signals, and
determining the parameter value satisfying the predetermined criteria:

$$(\hat{h}_L, \alpha) = \underset{h(\alpha), \alpha}{\operatorname{argmin}} \|y - M(\alpha) h_L(\alpha)\|^2.$$

4. Method according to claim 1, wherein the parameter is an angle, a set of parameter values comprising $$0, \frac{\pi}{8}, \frac{\pi}{4} \text{ and } \frac{3\pi}{8}$$

or a SCPIR ratio, the set of parameter values being tested comprising +4 dB, 0 dB, −4 dB, −8 dB, −10 dB.

5. Method according to claim 1, wherein the step of determining whether said mode of communication has to be activated comprises an operation of comparing the determined parameter value with at least one predetermined parameter threshold and an operation of comparing the signal to noise ratio estimation with at least one predetermined signal to noise ratio threshold.

6. A non-transitory computer readable medium, having thereon a computer program comprising program instructions, the computer program being loadable into a data-processing unit of a mobile station and when the computer program is run by the data-processing unit the computer program causes the data-processing unit to:
operate in a Voice Services over Adaptive Multi-user Channels on One Slot-1 (VAMOS-1) mode of communication,
receive a first signal of a first subchannel, the first signal containing a first training sequence, and receiving a second signal of a second subchannel, the second signal containing a second training sequence, the second signal being orthogonally multiplexed with respect to the first signal,
use, by the mobile station, the first training sequence and the second training sequence to:
determine a value of a parameter defining a ratio between a power of the first subchannel and a power of the second subchannel,
determine a signal to noise ratio estimation, and
determine, by using the parameter value and the signal to noise ratio estimation, whether to switch from the VAMOS-1 mode of communication to a VAMOS-2 mode of communication.

7. Mobile station configured to:
operate in a Voice Services over Adaptive Multi-user Channels on One Slot-1 (VAMOS-1) mode of communication,
receive a signal containing simultaneously two sub-channels, the first sub-channel containing a first training sequence, and the second sub-channel containing a second training sequence, the second signal being orthogonally multiplexed with respect to the first signal,
use, by the mobile station, the first training sequence and the second training sequence to:
determine a value of a parameter defining a ratio between a power of the first subchannel and a power of the second subchannel,
determine a signal to noise ratio estimation, and
determine, by using the parameter value and the signal to noise ratio estimation, whether to switch from the VAMOS-1 mode of communication to a VAMOS-2 mode of communication.

8. Mobile station according to claim 7, further configured to calculate a channel estimation $\hat{h}_L(\alpha)$ for each parameter value of a set of possible parameter values, and determine the parameter value satisfying at least one predetermined criteria.

9. Mobile station according to claim 8, further configured to:
for each parameter value $\alpha$ of the set of possible parameter values:
define a circulant training sequence matrix M as:

$$M(\alpha) = \begin{bmatrix} m_{L+1}(\alpha) & \ldots & m_2(\alpha) & m_1(\alpha) \\ m_{L+2}(\alpha) & \ldots & m_3(\alpha) & m_2(\alpha) \\ \vdots & \vdots & \vdots & \vdots \\ m_{P+L}(\alpha) & \ldots & m_{P+1}(\alpha) & m_P(\alpha) \end{bmatrix}$$

where L is a correlation length, P is a correlation window, and $m_{P+L}(\alpha)$ is one of the first and second training sequences related to the parameter value,
define a channel estimation $\hat{h}_L(\alpha)$ by:

$$\hat{h}_L(\alpha) = ((M(\alpha))^H M(\alpha))^{-1} M(\alpha) y,$$

where $A^H$ is the Hermitian of the matrix A and y is one of the first and second received signals, and
determine the parameter value satisfying the predetermined criteria:

$$(\hat{h}_L, \alpha) = \underset{h(\alpha), \alpha}{\operatorname{argmin}} \|y - M(\alpha) h_L(\alpha)\|^2.$$

10. Mobile station according to claim 7, wherein the parameter is an angle, a set of parameter values comprising $0, \frac{\pi}{8}, \frac{\pi}{4}$ and $\frac{3\pi}{8}$ or a SCPIR ratio, the set of parameter values being tested comprising +4 dB, 0 dB, −4 dB, −8 dB, −10 dB.

11. Mobile station according to claim 7, further configured to compare the determined parameter value with at least one predetermined parameter threshold and compare the signal to noise ratio estimation with at least one predetermined signal to noise ratio threshold.

\* \* \* \* \*